United States Patent
Nishibayashi et al.

(10) Patent No.: US 11,257,622 B2
(45) Date of Patent: Feb. 22, 2022

(54) MULTILAYER CERAMIC ELECTRONIC COMPONENT

(71) Applicant: Murata Manufacturing Co., Ltd., Nagaokakyo (JP)

(72) Inventors: Kazuhiro Nishibayashi, Nagaokakyo (JP); Yoshiyuki Nomura, Nagaokakyo (JP); Naoto Muranishi, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 16/813,789

(22) Filed: Mar. 10, 2020

(65) Prior Publication Data

US 2020/0312562 A1 Oct. 1, 2020

(30) Foreign Application Priority Data

Mar. 27, 2019 (JP) .............................. JP2019-061956

(51) Int. Cl.
*H01G 4/232* (2006.01)
*H01G 4/008* (2006.01)
(Continued)

(52) U.S. Cl.
CPC ........... *H01G 4/2325* (2013.01); *H01G 4/008* (2013.01); *H01G 4/1227* (2013.01); *H01G 4/30* (2013.01)

(58) Field of Classification Search
CPC .... H01G 4/008; H01G 4/0085; H01G 4/1227; H01G 4/232; H01G 4/2325; H01G 4/30
See application file for complete search history.

(56) References Cited

U.S. PATENT DOCUMENTS

| 2011/0290542 A1 | 12/2011 | Nishisaka et al. |
| 2013/0200749 A1 | 8/2013 | Nishisaka et al. |

(Continued)

FOREIGN PATENT DOCUMENTS

| JP | 08-124786 A | 5/1996 |
| JP | 2002170736 A | * 6/2002 |

(Continued)

OTHER PUBLICATIONS

Official Communication issued in corresponding Korean Patent Application No. 10-2020-0024831, dated Jan. 24, 2021.

(Continued)

*Primary Examiner* — Nathan Milakovich
(74) *Attorney, Agent, or Firm* — Keating & Bennett, LLP

(57) ABSTRACT

A ceramic electronic component includes a ceramic main body in which dielectric layers and internal electrodes are laminated, the ceramic main body including a pair of principal surfaces, a pair of side surfaces, and a pair of end surfaces, the internal electrodes are exposed to the end surfaces, and an underlayer external electrode covers at least a portion of the end surface. When a section of the ceramic main body is viewed, the underlayer external electrode is discontinuously provided on the ceramic main body. The ceramic main body includes an exposed region partially exposed from the discontinuously provided underlayer external electrode, the exposed region is covered with a resin layer, and the underlayer external electrode is covered with a plating film.

14 Claims, 6 Drawing Sheets

(51) Int. Cl.
*H01G 4/12* (2006.01)
*H01G 4/30* (2006.01)

(56) References Cited

U.S. PATENT DOCUMENTS

| | | | |
|---|---|---|---|
| 2014/0292142 A1 | 10/2014 | Nishisaka et al. | |
| 2017/0098505 A1* | 4/2017 | Ando | H01G 4/232 |
| 2017/0103853 A1* | 4/2017 | Zenzai | H01G 4/005 |
| 2017/0294268 A1* | 10/2017 | Katsuta | H01G 4/012 |
| 2019/0189349 A1* | 6/2019 | Kim | H01G 4/2325 |

FOREIGN PATENT DOCUMENTS

| | | |
|---|---|---|
| JP | 2003-243249 A | 8/2003 |
| JP | 2012-009813 A | 1/2012 |
| JP | 2013-179268 A | 9/2013 |
| JP | 5930045 B2 | 6/2016 |
| KR | 10-2014-0117295 A | 10/2014 |

OTHER PUBLICATIONS

Official Communication issued in corresponding Japanese Patent Application No. 2019-061956, dated Nov. 9, 2021.

* cited by examiner

MULTILAYER CERAMIC ELECTRONIC COMPONENT

CROSS REFERENCE TO RELATED APPLICATIONS

This application claims the benefit of priority to Japanese Patent Application No. 2019-061956 filed on Mar. 27, 2019. The entire contents of this application are hereby incorporated herein by reference.

BACKGROUND OF THE INVENTION

1. Field of the Invention

The present invention relates to a multilayer ceramic electronic component, and more particularly to a multilayer ceramic electronic component in which mechanical strength and reliability are improved.

2. Description of the Related Art

Multilayer ceramic electronic components such as multilayer ceramic capacitors, multilayer ceramic thermistors, multilayer ceramic inductors, and multilayer ceramic composite components are widely used in electronic devices. Japanese Patent Laid-Open No. 2003-243249 discloses a multilayer ceramic capacitor. FIG. 9 illustrates a multilayer ceramic capacitor 1000 disclosed in Japanese Patent Laid-Open No. 2003-243249.

Multilayer ceramic capacitor 1000 includes a ceramic main body 101. An internal electrode 102 is formed in ceramic main body 101. An external electrode 105 including an underlayer external electrode 103 formed by baking a conductive paste and a plating film 104 formed on underlayer external electrode 103 is formed on an end surface of ceramic main body 101.

In the multilayer ceramic electronic component having the above configuration, there is demand for improvement of mechanical strength between the ceramic main body and the external electrode. That is, there is a need for a multilayer ceramic electronic component in which a crack is not generated in the ceramic main body or the external electrode is not peeled from the ceramic main body even when stress is applied due to an external force or a heat cycle after the multilayer ceramic electronic component is mounted on a circuit board.

Various methods have been studied as a method for improving the mechanical strength between a ceramic main body and the external electrode in the multilayer ceramic electronic component.

For example, there is a method for additionally forming a conductive resin layer having a certain thickness between underlayer external electrode 103 and plating film 104 in the structure of multilayer ceramic capacitor 1000. In the method, the mechanical strength is improved because the stress due to the external force, the thermal cycle, or the like can be released by the resin layer.

As another method, there is a method for discontinuously forming underlayer external electrode 103 on ceramic main body 101. That is, there is a method for applying a conductive paste thinner than usual to the end surface of ceramic main body 101 when forming underlayer external electrode 103, thereby discontinuously forming underlayer external electrode 103 by baking. In the method, because underlayer external electrode 103 is discontinuously formed on ceramic main body 101, residual stress of underlayer external electrode 103 with respect to ceramic main body 101 is relieved to improve the mechanical strength between ceramic main body 101 and external electrode 105.

However, the above method for additionally forming the conductive resin layer having the large thickness between underlayer external electrode 103 and plating film 104 has a problem in that the thickness of external electrode 105 increases.

Generally, a standard of an external dimension of the multilayer ceramic electronic component is defined while including the thickness of the external electrode. For this reason, when the thickness of external electrode 105 increases due to the formation of the conductive resin layer, the outer dimensions of ceramic main body 101 need to decrease by the increased thickness of external electrode 105. In order to decrease the external dimension of ceramic main body 101, it is necessary to decrease the number of laminated internal electrodes 102 and to reduce an area of internal electrodes 102. For this reason, the multilayer ceramic capacitor in which the conductive resin layer is additionally formed on external electrode 105 has a problem in that a capacitance is hardly increased due to the large thickness of external electrode 105.

On the other hand, the method for discontinuously forming underlayer external electrode 103 has a problem in that reliability of moisture resistance of the multilayer ceramic capacitor and the like is degraded. That is, in the method for discontinuously forming underlayer external electrode 103, internal electrode 102 is exposed in the discontinuous portion of underlayer external electrode 103 in the end surface of ceramic main body 101, and moisture invades into the inside through a gap between ceramic main body 101 and internal electrode 102, which results in such the degradation of the reliability as the degradation of IR (insulation resistance).

SUMMARY OF THE INVENTION

Preferred embodiments of the present invention provide multilayer ceramic electronic components which each include a ceramic main body in which a plurality of dielectric layers and a plurality of internal electrodes are laminated, the ceramic main body including a pair of principal surfaces opposed to each other in a lamination direction, a pair of side surfaces opposed to each other in a width direction orthogonal or substantially orthogonal to the lamination direction, and a pair of end surfaces opposed to each other in a length direction orthogonal or substantially orthogonal to both the lamination direction and the width direction. The plurality of internal electrodes are exposed to the pair of end surfaces, an underlayer external electrode covers at least a portion of the pair of end surfaces, the underlayer external electrode is discontinuously provided on the ceramic main body when a section of the ceramic main body parallel or substantially parallel to the side surface along an end in the width direction of the internal electrode is viewed, the ceramic main body includes an exposed region partially exposed from the discontinuously-provided underlayer external electrode, the exposed region is covered with a resin layer including resin, and the underlayer external electrode is covered with a plating film.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1A:
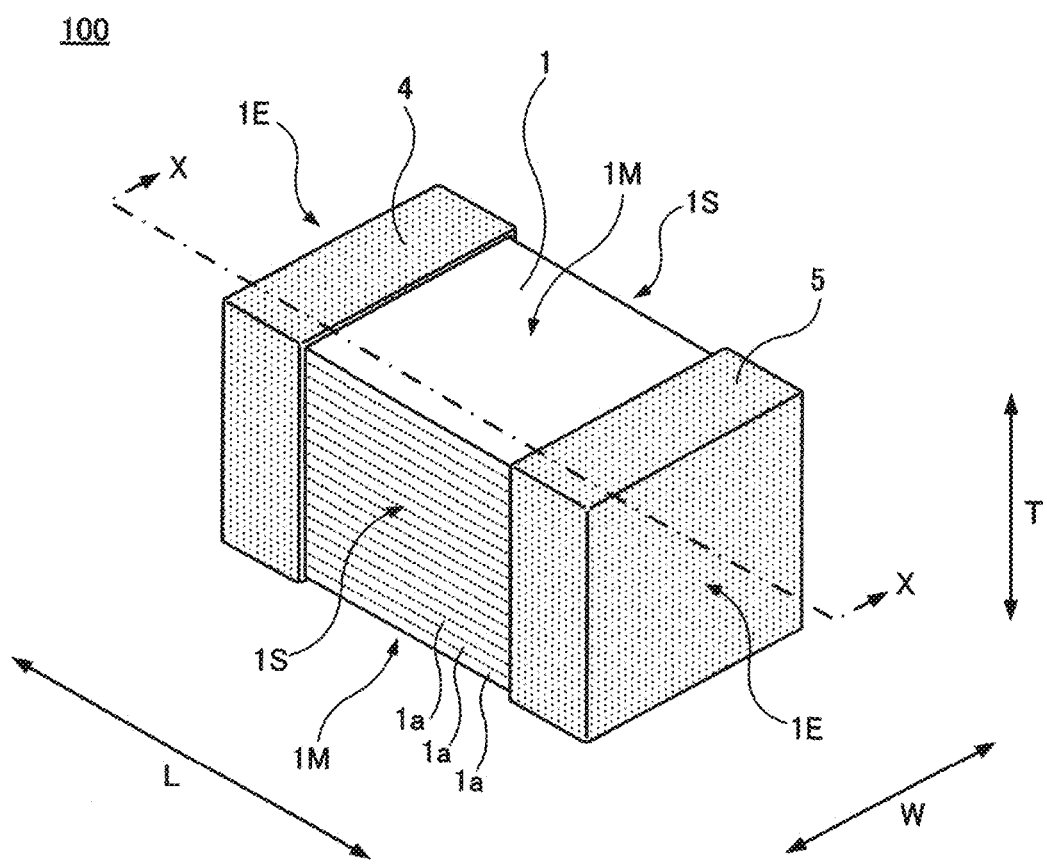
FIG. 1A is a perspective view illustrating a multilayer ceramic capacitor 100 according to a preferred embodiment of the present invention.

Hereinafter, preferred embodiments of the present invention will be described with reference to the drawings. The preferred embodiments are merely examples of the present invention, and the present invention is not limited to the content of the preferred embodiments. It is also possible to combine the contents described in the preferred embodiments, and the contents of such cases are also included in the present invention. The drawings are used to assist understanding of the specification, sometimes the drawing is schematically drawn, and a ratio of dimensions between drawn components is not matched with a ratio of their dimensions described in the specification. Sometimes the component described in the specification may be omitted in the drawings, or drawn with the number of components omitted.

In the preferred embodiments of the present invention, a multilayer ceramic capacitor will be described as an example of a multilayer ceramic electronic component. However, the type of the multilayer ceramic electronic component of the present invention is arbitrary, and is not limited to the multilayer ceramic capacitor.

Figure 1B:
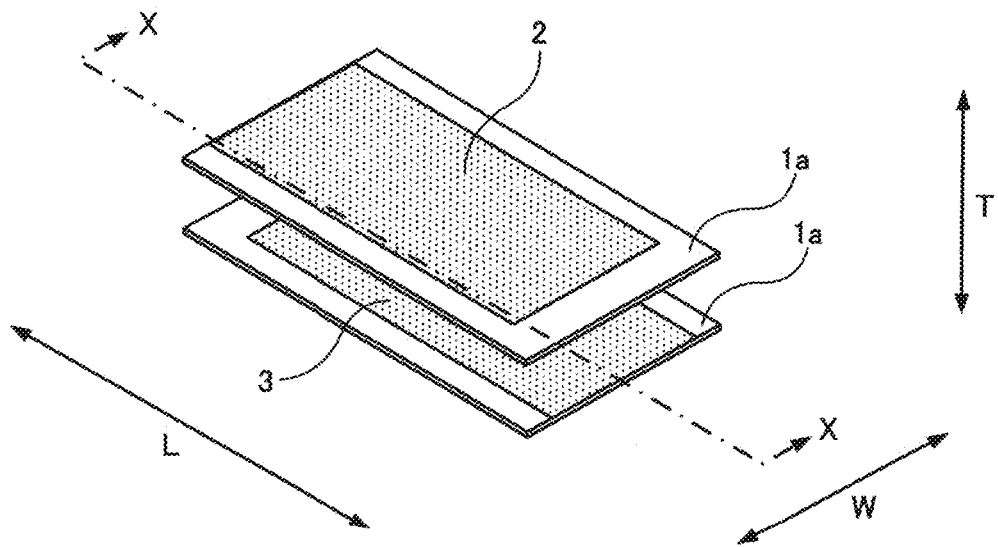
FIG. 1B is an exploded perspective view illustrating a basic portion of multilayer ceramic capacitor 100 of a preferred embodiment of the present invention.
Figure 2:
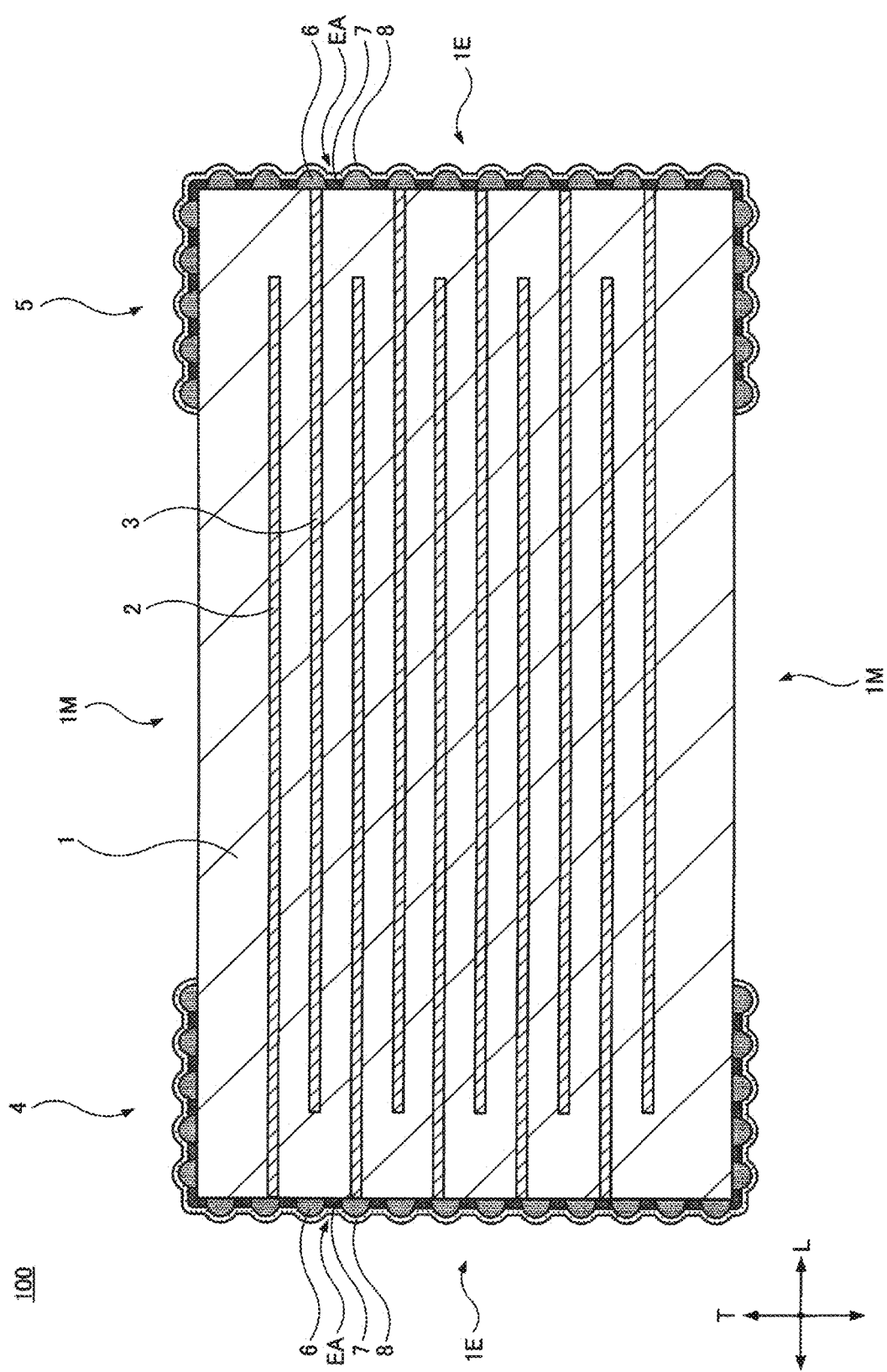
FIG. 2 is a sectional view illustrating multilayer ceramic capacitor 100 of a preferred embodiment of the present invention.

FIGS. 1A, 1B, and 2 illustrate a multilayer ceramic capacitor 100 according to a preferred embodiment of the present invention. FIG. 1A is a perspective view illustrating multilayer ceramic capacitor 100. FIG. 1B is an exploded perspective view illustrating a basic portion of multilayer ceramic capacitor 100, and illustrates two layers of a plurality of dielectric layers 1a (to be described later). FIG. 2 is a sectional view illustrating multilayer ceramic capacitor 100, and illustrates a portion X-X indicated by an arrow of an alternate long and short dash line in FIGS. 1A and 1B. In the drawings, a length direction L, a width direction W, and a height direction T are illustrated, and sometimes these directions are referred to in the following description.

Multilayer ceramic capacitor 100 includes a ceramic main body 1 in which a plurality of dielectric layers 1a and a plurality of internal electrodes 2 and 3 are laminated. Ceramic main body 1 has a rectangular or substantially rectangular parallelepiped shape, and includes a pair of principal surfaces 1M opposed to each other in height direction T (lamination direction), a pair of side surfaces 1S opposed to each other in width direction W orthogonal or substantially orthogonal to height direction T, and a pair of end surfaces 1E opposed to each other in length direction L orthogonal or substantially orthogonal to both height direction T and width direction W.

Ceramic main body 1 (dielectric layer 1a) is made of any suitable material, for example, a dielectric ceramic mainly including $BaTiO_3$ can be used. Alternatively, a dielectric ceramic mainly including other materials such as, for example, $CaTiO_3$, $SrTiO_3$, $CaZrO_3$ may be used instead of $BaTiO_3$. For example, a thickness of dielectric layer 1a preferably ranges from about 0.3 μm to about 5.0 μm.

Internal electrodes 2, 3 are made of any suitable material. For example, Ni can be used. Alternatively, other metals such as, for example, Cu and Pd may be used instead of Ni. An alloy of Ni, Cu, Pd, and the like and other metals, for example, may be used. For example, the thicknesses of internal electrodes 2, 3 preferably range from about 0.1 μm to about 3.0 μm.

A plurality of internal electrodes 2 are led out to one end surface 1E. A plurality of internal electrodes 3 are led out to the other end surface 1E.

An external electrode 4 is provided on one end surface 1E of ceramic main body 1. An external electrode 5 is provided on the other end surface 1E of ceramic main body 1. Each of external electrodes 4, 5 has a cap shape, and extends from end surface 1E toward the pair of principal surfaces 1M and the pair of side surfaces 1S.

The plurality of internal electrodes 2 are connected to external electrodes 4. The plurality of internal electrodes 3 are connected to external electrodes 5.

As illustrated in FIG. 2, each of external electrodes 4, 5 includes an underlayer external electrode 6 on an outer surface of ceramic main body 1. As can be seen from FIG. 2, underlayer external electrode 6 is discontinuously provided on ceramic main body 1. Underlayer external electrode 6 is made of any suitable material. For example, Cu and glass can be used. Alternatively, other metals such as, for example, Ag and Ni may be used instead of Cu. An alloy of Cu, Ag, Ni, and the like and other metals, for example, may be used.

Because underlayer external electrode 6 is discontinuously provided, ceramic main body 1 includes an exposed region EA partially exposed from underlayer external electrode 6. In end surface 1E, internal electrodes 2, 3 are partially exposed from exposed region EA of ceramic main body 1.

Exposed region EA is covered with a resin layer 7. Any kind of resin can be used as resin layer 7. For example, an epoxy resin or a silicone resin can be used. In the present preferred embodiment, an insulating resin is used as resin layer 7. However, resin layer 7 may be conductive, and a conductive resin including Ag or the like, for example, may be used.

Underlayer external electrode 6 exposed from resin layer 7 is covered with a plating film 8. The material and the number of layers of plating film 8 are arbitrary. For example, a two-layer structure in which the first layer is made of an Ni plating film and the second layer is made of an Sn plating film can be used as plating film 8. However, in FIG. 2, plating film 8 is illustrated as a single layer for convenience. For example, the thickness per layer of plating film 8 preferably ranges from about 0.1 μm to about 5.0 μm.

When a section in FIG. 2 (a section of ceramic main body 1 parallel or substantially parallel to side surface 1S along the end in width direction W of internal electrodes 2, 3; a section of a portion X-X indicated by an arrow of an alternate long and short dash line in FIGS. 1A and 1B) is viewed, preferably the thickness of resin layer 7 is, for example, less than or equal to about 50% of the thickness of the underlayer external electrode 6 at end surface 1E of a portion in which internal electrode 2 or 3 closest to principal surface 1M is exposed. When the thickness of resin layer 7 is less than or equal to about 50%, plating film 8 is favorably formed on resin layer 7 covering exposed region EA of ceramic main body 1. This is because the provision of plating film 8 in the portion improves electrical characteristics such as ESR (Equivalent Series Resistance).

Preferably, the maximum thickness of underlayer external electrode 6 in end surface 1E of ceramic main body 1 is, for example, less than or equal to about 1/40 of the shortest distance between the pair of end surfaces 1E. When the maximum thickness of underlayer external electrode 6 exceeds about 1/40, it is difficult to discontinuously provide underlayer external electrode 6. Preferably, the maximum thickness of underlayer external electrode 6 in principal surface 1M and side surface 1S of ceramic main body 1 is, for example, less than or equal to about 1/60 of a larger one of the shortest distance of the pair of principal surfaces 1M and the shortest distance of the pair of side surfaces 1S.

In multilayer ceramic capacitor 100 of the present preferred embodiment having the above structure, because underlayer external electrode 6 is discontinuously provided on ceramic main body 1, residual stress of underlayer external electrode 6 provided on ceramic main body 1 is relieved, and the mechanical strength between ceramic main body 1 and external electrodes 4, 5 is improved.

In multilayer ceramic capacitor 100 of the present preferred embodiment, because the discontinuous portion (exposed region EA of ceramic main body 1) of underlayer external electrode is covered by resin layer 7, reliability such as moisture resistance is ensured.

A non-limiting example of a method for manufacturing multilayer ceramic capacitor 100 according to a preferred embodiment of the present invention will be described with reference to FIGS. 3 to 8.

Figure 3:
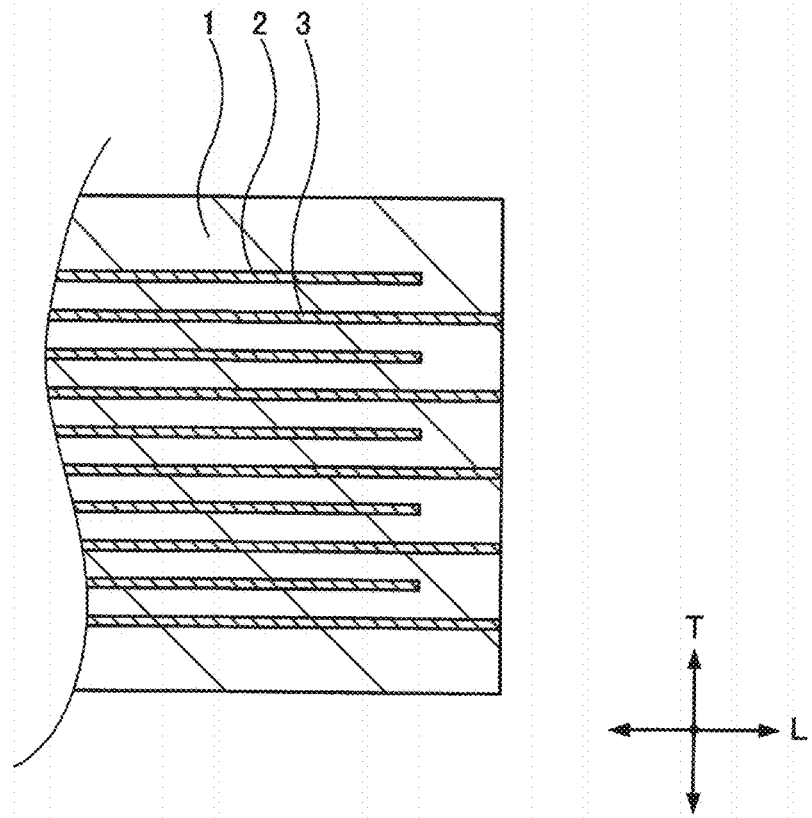
FIGS. 3 to 8 are sectional views illustrating processes performed in a non-limiting example of a method for manufacturing multilayer ceramic capacitor 100 of a preferred embodiment of the present invention.

First, ceramic main body 1 in FIG. 3 is prepared.

Although illustration is omitted, dielectric ceramic powder, a binder resin, a solvent, and the like are provided, and wet-mixed to prepare ceramic slurry.

Subsequently, the ceramic slurry is applied on a carrier film in a sheet shape using a die coater, a gravure coater, a microgravure coater, or the like, for example, and dried to prepare a ceramic green sheet.

Subsequently, a previously-prepared conductive paste is printed in a desired pattern shape in order to form internal electrodes 2, 3 on the principal surface of a predetermined ceramic green sheet. The conductive paste is not printed on the ceramic green sheet defining a protective layer.

Subsequently, the ceramic green sheets are laminated in predetermined order, and integrated by heating and pressing to prepare the unbaked ceramic main body.

Subsequently, the unbaked ceramic main body is baked with a predetermined profile to complete ceramic main body 1. At this point, the conductive paste printed on the principal surface of the ceramic green sheet is also baked at the same time to form internal electrodes 2, 3 in ceramic main body 1.

Figure 4:
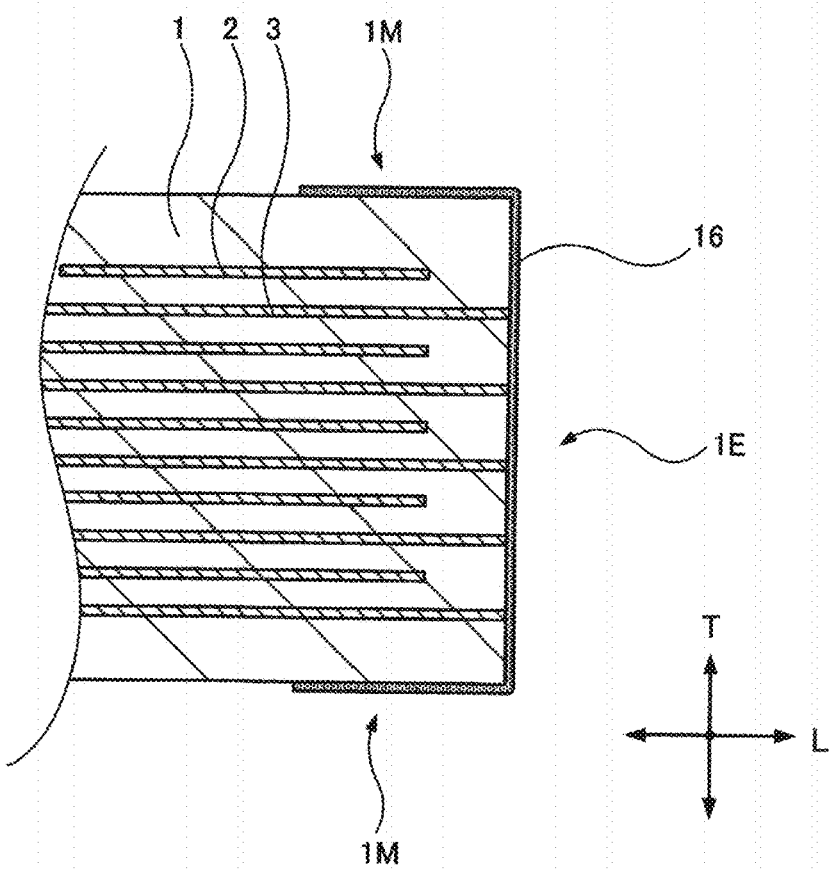

Then, as illustrated in FIG. 4, a conductive paste 16 is applied to both ends of ceramic main body 1 in order to form underlayer external electrode 6 on ceramic main body 1. Specifically, the end of ceramic main body 1 is immersed in a bath in which conductive paste 16 is disposed. For the first time, the end of ceramic main body 1 is immersed in the bath in which conductive paste 16 is relatively deep such that conductive paste 16 is applied to not only end surface 1E of ceramic main body 1 but also the pair of principal surfaces 1M and the pair of side surfaces 1S. For the second time, in order to remove excess conductive paste 16, the end of ceramic main body 1 is immersed in the bath in which conductive paste 16 is shallow. The end of ceramic main body 1 may be immersed in the bath at least three times.

In the present preferred embodiment, the thickness of conductive paste 16 applied to the end of ceramic main body 1 is set smaller than the case where a general multilayer ceramic capacitor is prepared. This is because underlayer external electrode 6 is discontinuously formed on ceramic main body 1.

Figure 5:
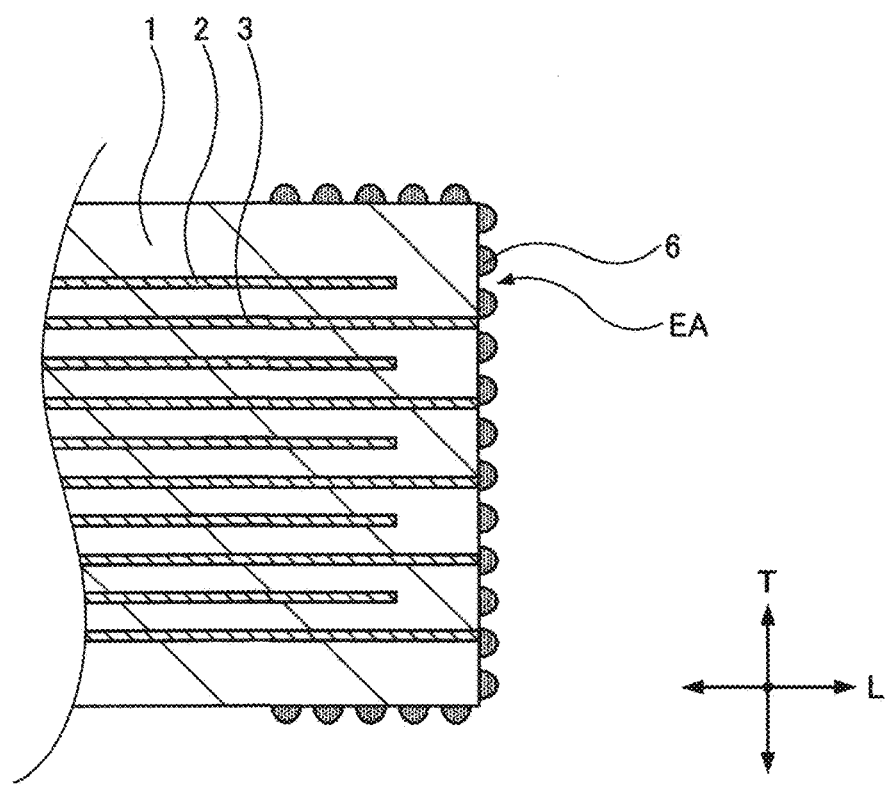

Then, ceramic main body 1 is heated with a predetermined profile, and conductive paste 16 applied to the end of ceramic main body 1 is baked on ceramic main body 1. As a result, as illustrated in FIG. 5, the discontinuous underlayer external electrodes 6 are formed at both the ends of ceramic main body 1. The ceramic main body 1 includes exposed region EA partially exposed from underlayer external electrode 6.

Then, an impregnating solution including a resin forming resin layer 7 is prepared. Specifically, the impregnating solution is a solution in which resin is dissolved in a solvent or the like.

Then, ceramic main body 1 on which underlayer external electrode 6 is formed is accommodated in a chamber. A bath in which the impregnating solution including the resin is disposed is previously prepared as the chamber.

Then, the inside of the chamber is evacuated. For example, an evacuation time is set to about 5 minutes. Subsequently, ceramic main body 1 on which underlayer external electrode 6 is formed is impregnated in the bath in which the impregnating liquid including the resin is disposed. Subsequently, a pressure in the chamber is increased to perform pressurization. For example, a pressurization time is set to about 5 minutes. Subsequently, after the inside of the chamber is returned to an atmospheric pressure, ceramic main body 1 is taken out of the chamber (bath in which the impregnating liquid including the resin is disposed). The above evacuation may be performed after ceramic main body 1 is impregnated in the bath in which an impregnating solution is disposed.

Figure 6:
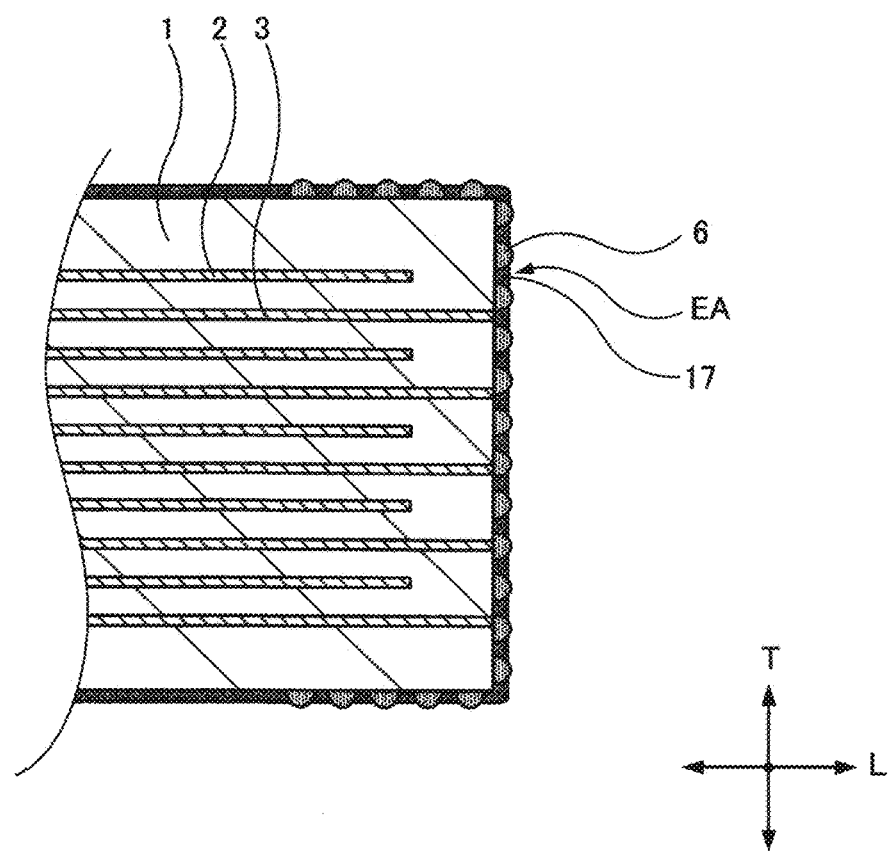

As a result, as illustrated in FIG. 6, resin 17 adheres to the outer surface of ceramic main body 1. Resin 17 also adheres to exposed region EA of ceramic main body 1.

Then, the outer surface of ceramic main body 1 to which resin 17 adheres is washed to remove resin 17 adhering to an unnecessary portion. For example, the washing is performed such that the thickness of resin 17 attached to exposed region EA of ceramic main body 1 becomes less than or equal to about 50% of the thickness of underlayer external electrode 6. Preferably resin 17 in a region, except for exposed region EA, where underlayer external electrode 6 is not formed is removed. Subsequently, ceramic main body 1 is drained and dried.

Figure 7:
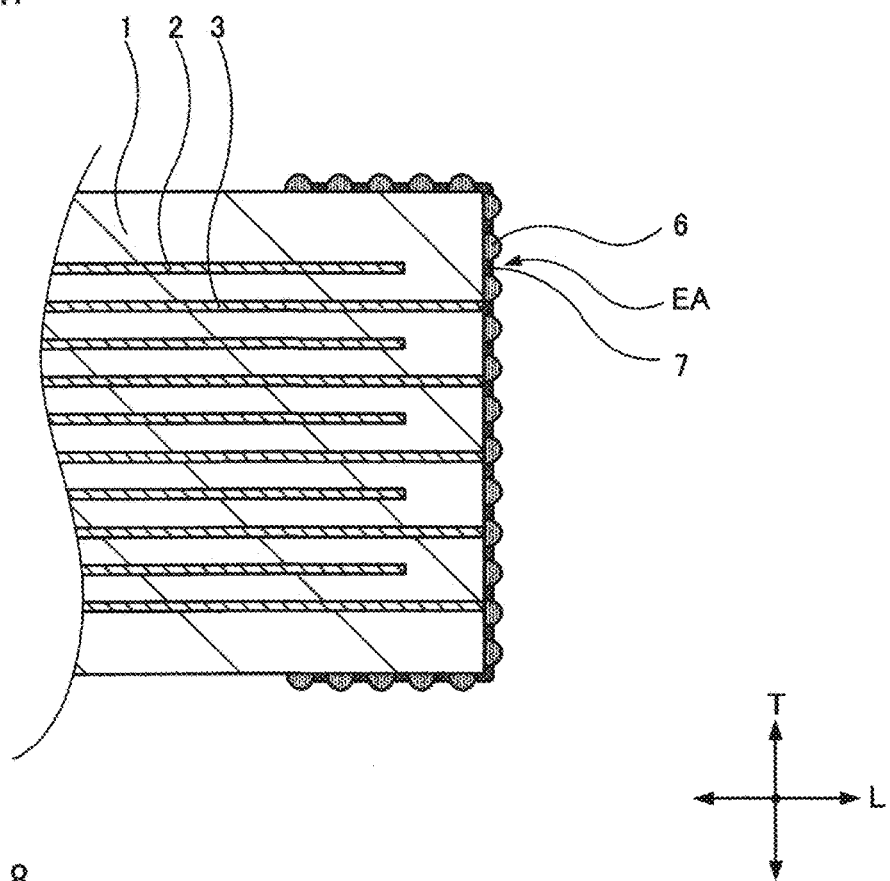

Then, ceramic main body 1 is heated with a predetermined profile to cure resin 17 attaching to the outer surface of ceramic main body 1. For example, the heating is performed at a temperature of about 150° C. for about 60 minutes. As a result, as illustrated in FIG. 7, exposed region EA of ceramic main body 1 is covered with resin layer 7.

Figure 8:
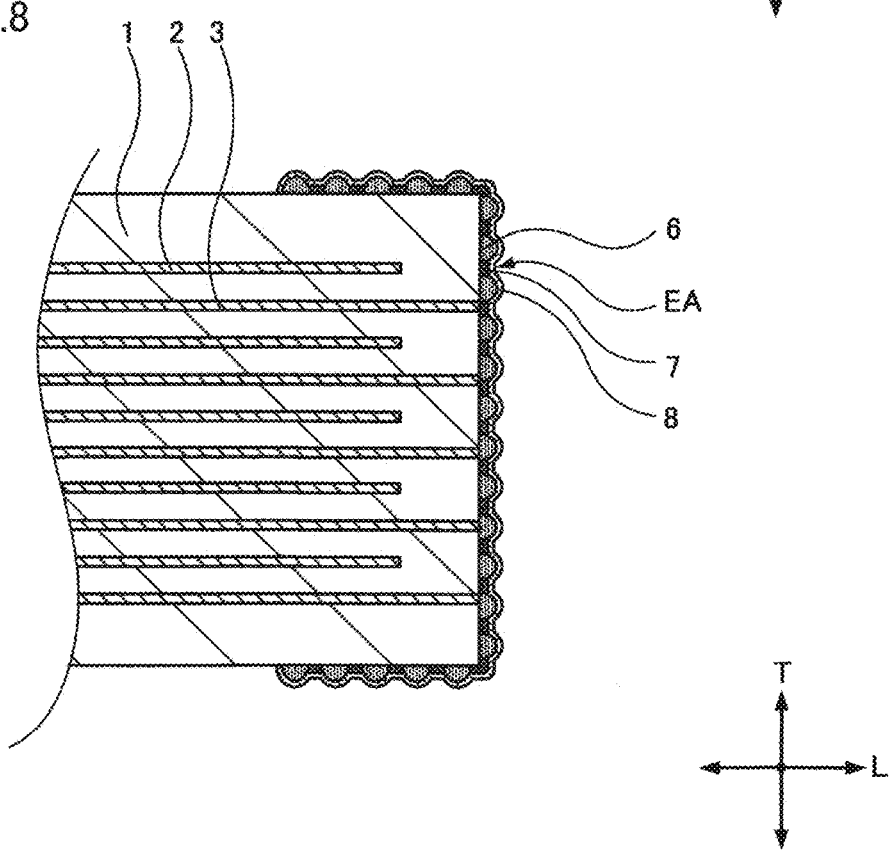
Figure 9:
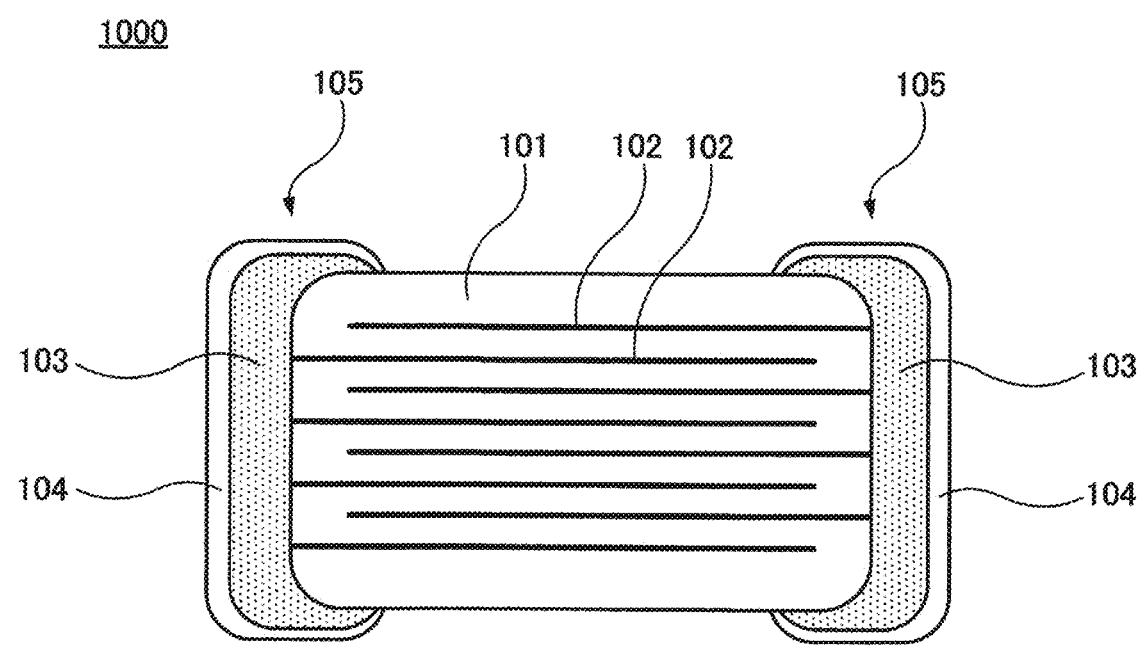
FIG. 9 is a sectional view illustrating a multilayer ceramic capacitor 1000 disclosed in Japanese Patent Laying-Open No. 2003-243249.

Then, as illustrated in FIG. 8, plating film 8 is formed by electrolytic plating, for example, and underlayer external electrode 6 is covered with plating film 8. In the preferred embodiment, plating film 8 also covers resin layer 7 formed in exposed region EA by growth of plating. As described above, multilayer ceramic capacitor 100 of the present preferred embodiment is completed.

An IR test was performed to check the reliability of multilayer ceramic capacitor 100. Multilayer ceramic capacitor 100 was prepared and used as an example. A chip size of multilayer ceramic capacitor 100 was 1005 (about 1.0 mm×about 0.5 mm×about 0.5 mm), the number of layers was 400, and the thickness of dielectric layer was about 0.6 µm. A multilayer ceramic capacitor in which resin layer 7 was omitted from multilayer ceramic capacitor 100, namely, a multilayer ceramic capacitor in which discontinuous underlayer external electrode 6 was formed and then plating film 8 was formed without forming resin layer 7 was prepared, and used as a comparative example. After 72 examples and 72 comparative examples were left for about 500 hours with a voltage of about 6.3V applied in an environment of a temperature of about 65° C. and a relative humidity of about 90%, the IR value of each sample was measured. A sample having the IR value less than or equal to about 8.00 was regarded as an IR-degraded product. The IR-degraded product was not generated in the 72 examples. On the other hand, in the comparative example, 9 IR-degraded products were generated in the 72 comparative examples. Consequently, it was confirmed that multilayer ceramic capacitor 100 has the high moisture resistance and the high reliability.

Multilayer ceramic capacitor 100 of the present preferred embodiment is described above. However, the present invention is not limited to the preferred embodiment described above, and various changes can be made in accordance with the gist of the invention.

For example, in the above preferred embodiment, multilayer ceramic capacitor 100 has been described by way of example. However, the kind of the multilayer ceramic electronic component of the present invention is arbitrary, and is not limited to the multilayer ceramic capacitor, and the multilayer ceramic electronic component of the present invention may be other kinds of laminated ceramic electronic components, such as a multilayer ceramic thermistor, a multilayer ceramic inductor, and a multilayer ceramic composite component, for example.

In the above preferred embodiment, resin layer 7 covers the entire or substantially the entire exposed region EA of ceramic main body 1, but resin layer 7 does not need to cover the entire or substantially the entire exposed region EA of ceramic main body 1. That is, resin layer 7 may be provided on exposed region EA of ceramic main body 1 in a partially interrupted configuration (interrupted state).

In the above preferred embodiment, resin layer 7 contacts with ceramic main body 1, but resin layer 7 does not need to contact with ceramic main body 1. That is, a gap may be provided between ceramic main body 1 and resin layer 7. The gap may completely separate ceramic main body 1 and resin layer 7, or partially separate ceramic main body 1 and resin layer 7.

In the above preferred embodiment, plating film 8 is continuously formed on underlayer external electrode 6 and resin layer 7, but plating film 8 does not need to be continuously formed. That is, plating film 8 may be discontinuously formed.

In the above preferred embodiment, entire resin layer 7 formed in exposed region EA is covered with plating film 8, but entire resin layer 7 does not need to be covered with plating film 8. That is, resin layer 7 may partially be covered with plating film 8. Alternatively, resin layer 7 may not be covered at all with plating film 8.

In the above preferred embodiment, resin layer 7 has the insulating property, but resin layer 7 may be conductive.

In the above preferred embodiment, external electrodes 4, 5 are provided on not only end surface 1E of ceramic main body 1 but also the pair of principal surfaces 1M and the pair of side surfaces 1S, but external electrodes 4, 5 may be provided only on end surface 1E and principal surface 1M.

In the above preferred embodiment, underlayer external electrode 6 is formed later by baking at the end of fired ceramic main body 1, but underlayer external electrode 6 may be simultaneously formed by burning together with ceramic main body 1.

In the multilayer ceramic capacitor, the internal electrode may partially be exposed from the exposed region in the end surface of the ceramic main body. This is because, even when the internal electrode is partially exposed from the exposed region, in preferred embodiments of the present invention, because the exposed region is covered with the resin layer, the moisture resistance can sufficiently be ensured.

When the section of the ceramic main body parallel or substantially parallel to the side surface along the end in the width direction of the internal electrode is viewed, preferably the thickness of the resin layer is, for example, less than or equal to about 50% of the thickness of the underlayer external electrode in the end surface of the portion where the internal electrode closest to the principal surface is exposed. When the thickness of the resin layer is less than or equal to about 50%, the plating film is favorably formed on the resin layer covering the exposed region of the ceramic main body, and the electrical characteristics such as ESR are improved.

The resin layer may have an insulating property. Even when the resin layer has an insulating property, the underlayer external electrode and the plating film are electrically connected to each other.

Preferably, the maximum thickness of the underlayer external electrode in the end surface is, for example, less than or equal to about 1/40 of the shortest distance between the pair of end surfaces 1E. When the maximum thickness of the underlayer external electrode exceeds about 1/40, it is difficult to discontinuously provide the underlayer external electrode.

Preferably, the maximum thickness of underlayer external electrode 6 in principal surface 1M and side surface 1S of ceramic main body 1 is, for example, less than or equal to about 1/60 of a larger one of the shortest distance of the pair of principal surfaces 1M and the shortest distance of the pair of side surfaces 1S.

Preferably, at least a portion of the exposed region of the ceramic main body is covered with a resin layer in the pair of principal surfaces or the pair of side surfaces. In this case, the moisture resistance of the electronic component can be further improved.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic electronic component comprising:
   a ceramic main body including a plurality of dielectric layers and a plurality of internal electrodes that are laminated; wherein
   the ceramic main body includes:
   a pair of principal surfaces opposed to each other in a lamination direction;

a pair of side surfaces opposed to each other in a width direction orthogonal or substantially orthogonal to the lamination direction; and a pair of end surfaces opposed to each other in a length direction orthogonal or substantially orthogonal to both the lamination direction and the width direction;

the plurality of internal electrodes are exposed to the pair of end surfaces;

an underlayer external electrode covers at least a portion of the pair of end surfaces;

the underlayer external electrode is discontinuously provided on the ceramic main body when a section of the ceramic main body parallel or substantially parallel to the pair of side surfaces along an end of the plurality of internal electrodes is viewed in the width direction;

the ceramic main body includes an exposed region partially exposed from the discontinuously provided underlayer external electrode;

the exposed region is covered with a resin layer including resin;

a portion of the underlayer external electrode protrudes from the resin layer; and the underlayer external electrode is covered with a plating film.

2. The multilayer ceramic electronic component according to claim 1, wherein at least one of the plurality of internal electrodes is partially exposed from the exposed region of the ceramic main body on at least one of the pair of end surfaces.

3. The multilayer ceramic electronic component according to claim 2, wherein when the section of the ceramic main body parallel or substantially parallel to the pair of side surfaces along the end of the plurality of internal electrodes is viewed in the width direction, a thickness of the resin layer is less than or equal to about 50% of a thickness of the underlayer external electrode on at least one of the pair of end surfaces of a portion in which an internal electrode of the plurality of internal electrodes closest to one of the pair of principal surfaces is exposed.

4. The multilayer ceramic electronic component according to claim 1, wherein the resin layer has an insulating property.

5. The multilayer ceramic electronic component according to claim 1, wherein a maximum thickness of the underlayer external electrode on the pair of end surfaces is less than or equal to about 1/40 of a shortest distance between the pair of end surfaces.

6. The multilayer ceramic electronic component according to claim 1, wherein the underlayer external electrode further covers at least one of a portion of the pair of principal surfaces and a portion of the pair of side surfaces.

7. The multilayer ceramic electronic component according to claim 6, wherein a maximum thickness of the underlayer external electrode on the at least one of the portion of the pair of principal surfaces and the portion of the pair of side surfaces is less than or equal to about 1/60 of a larger one of a shortest distance between the pair of principal surfaces and a shortest distance between the pair of side surfaces.

8. The multilayer ceramic electronic component according to claim 6, wherein at least a portion of the exposed region of the ceramic main body is covered with the resin layer on the pair of principal surfaces or the pair of side surfaces.

9. The multilayer ceramic electronic component according to claim 1, wherein the plurality of dielectric layers are made of $BaTiO_3$.

10. The multilayer ceramic electronic component according to claim 1, wherein the plurality of internal electrodes are made of Cu.

11. The multilayer ceramic electronic component according to claim 1, wherein the underlayer external electrode includes Cu and glass.

12. The multilayer ceramic electronic component according to claim 1, wherein the resin layer is made of epoxy resin or silicone resin.

13. The multilayer ceramic electronic component according to claim 1, wherein the resin layer includes Ag.

14. The multilayer ceramic electronic component according to claim 1, wherein a thickness of the plating film is in a range of about 0.1 μm to about 5.0 μm.

* * * * *